HARVEY H. TROMBLY
ROBERT H. HARPER
INVENTORS

March 21, 1961 H. H. TROMBLY ET AL 2,976,120
SYSTEM FOR THE FORMATION OF AN AQUEOUS GAS SOLUTION
Filed May 16, 1957 2 Sheets-Sheet 2

HARVEY H. TROMBLY
ROBERT H. HARPER
INVENTORS

BY R. G. Story

ATTORNEY

United States Patent Office 2,976,120
Patented Mar. 21, 1961

2,976,120

SYSTEM FOR THE FORMATION OF AN AQUEOUS GAS SOLUTION

Harvey H. Trombly and Robert H. Harper, Park Forest, Ill., assignors to Swift & Company, Chicago, Ill., a corporation of Illinois Filed May 16, 1957, Ser. No. 659,523

8 Claims. (Cl. 23—157)

This invention relates to a system for the formation of an aqueous gas solution of a known concentration and is particularly adaptable to the formation of a nitric oxide-water solution for use by the packing industry in the development of the cured color in meat.

The present application is a continuation-in-part of our prior application Serial No. 493,276, filed March 9, 1955, and now abandoned.

It has been recently discovered, as disclosed in the copending application Serial No. 490,419 of Mr. Robert H. Harper, and now abandoned, that the red color of cured meat may be developed through use of preformed nitric oxide gas. Heretofore, curing compositions of nitrate and nitrite salts have been used for this purpose. One of the preferred ways for effecting curing with preformed nitric oxide gas is through contacting of the meat to be cured with a solution of nitric oxide in water.

An object of this invention is to provide a system for the ready manufacture of a nitric oxide in water solution of a known concentration.

This and other objects will be apparent from the reading of the following specification.

Broadly speaking, the system of our invention comprises a tank with means for evacuating the atmosphere of the tank and means for introducing nitric oxide to the evacuated tank at a predetermined pressure. Means are provided for introducing water to the tank to form a solution of the gas in water and means for emptying the aqueous solution from the tank. In the preferred form, the water has been deaerated and adjusted to a predetermined temperature before it is introduced into the tank.

Further objects and advantages will become apparent from the following description taken in conjunction with the drawings, in which.

Figure 1:
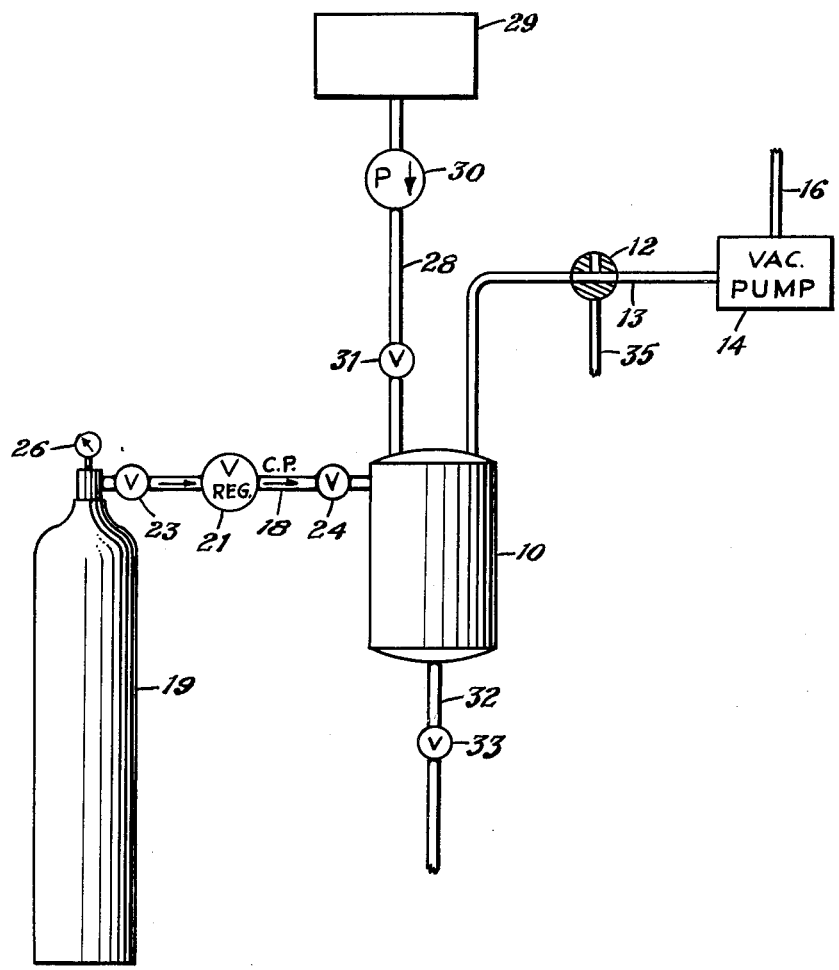
Figure 1 is a schematic illustration of an embodiment of our invention.

A mixing tank 10 of known volume is connected through a three-way valve 12 by a pipe 13 to a vacuum pump 14. The vacuum pump exhausts to the atmosphere through pipe 16.

The mixing tank is connected by a conduit 18 to a high-pressure tank of nitric oxide 19. A pressure regulator valve 21 is disposed in the conduit 18, with two shut-off valves 23 and 24 on either side of it. A pressure gauge 26 is fastened to the top of the high-pressure tank.

A third conduit 28 connects the mixing tank to a water source 29 through a pump 30. A shut-off valve 31 is placed in the line between the water pump and the mixing tank. A fourth line 32 coupling with the bottom of the mixing tank is employed for emptying the tank through a shut-off valve 33.

In the manufacture of an aqueous nitric oxide solution, shut-off valves 31, 24, and 33 are closed and the line 13 to the vacuum pump from the tank is opened through the three-way valve 12. After exhausting the atmosphere of the mixing tank by the vacuum pump, the three-way valve is moved to close the line 13 to the vacuum pump. At this time the shut-off valves 23 and 24 are opened to permit the flow of nitric oxide into the vacuum of the mixing tank to a pressure determined by the setting of the pressure regulator valve 21. Next the valves 23 and 24 are closed, the shut-off valve 31 is opened, and the water pump 30 energized to supply water to the mixing tank. The filling of the mixing tank with water forms a solution of gas in water. Valve 31 is then closed and the three-way valve 12 is opened to the atmosphere through conduit 35. With the opening of the shut-off valve 33 located at the outlet of the tank, the tank may be emptied of the aqueous gas solution and carried through pipe 32 to the point of use.

In the preparation of the aqueous nitric oxide solution, it is our recommendation that the water used in making the solution be deoxygenated. It will be appreciated that nitric oxide will readily combine with the oxygen of the air to form undesirable higher oxides of nitrogen. Depending on the source of water, it may sometimes be desirable to also deionize.

The concentration of nitric oxide in the water may be varied through the setting of the pressure regulator valve. If the pressure regulator valve is set to obtain a higher gas pressure within the mixing tank, this will result in a larger concentration of the nitric oxide gas in the water solution. If the concentration of the gas in water be too large, this may be remedied by setting the regulator valve to pass less of the gas to the mixing tank.

Figure 2:
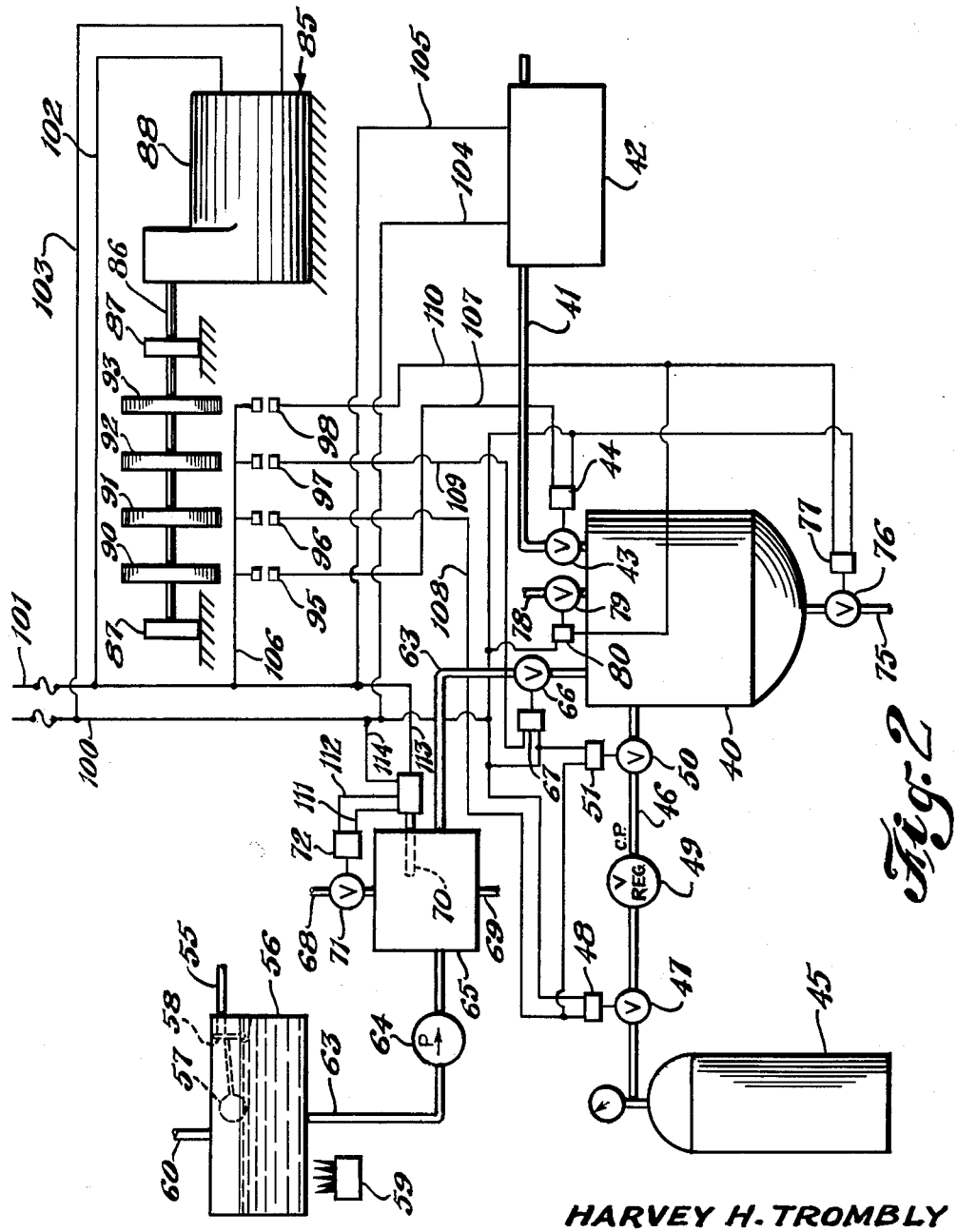
Figure 2 is a schematic illustration of a second embodiment particularly suited for automatic operation.

Referring to Fig. 2, a tank 40 in which a nitric oxide solution is to be made is connected by means of a conduit 41 to a vacuum pump 42. A normally closed valve 43 operated by a solenoid 44 is connected in conduit 41 immediately adjacent tank 40. Similarly, a suitable source of nitric oxide, as represented by tank 45, is connected by means of a conduit 46 to tank 40. In conduit 46 are a normally closed valve 47 operated by a solenoid 48, a pressure-regulating valve 49 and a normally closed valve 50 operated by a solenoid 51.

Water is supplied to the system from a suitable source, not shown, through pipe 55 leading to a deaerating tank 56. A float 57 operates a valve 58 to control the amount of water in tank 56. The water in tank 56 is maintained in a boiling condition by a suitable source of heat as represented by burner 59. Steam and air from tank 56 is released to the atmosphere through a pipe 60. The water in tank 56 and that feeding into the tank is deaerated by being maintained in a continuously boiling condition with steam filling the head space above the level of the water in the tank.

The conduit 63 connects the bottom of deaerating tank 56 with tank 40. In this conduit 63 is a pump 64, a heat exchanger 65 and a normally closed valve 66 operated by a solenoid 67. Coolant is circulated through heat exchanger 65 from a suitable source (not shown) by connection with pipes 68 and 69. Suitable means are provided for regulating the temperature of the water to be delivered through conduit 63 to tank 40. For example, in the illustrated embodiment a thermostat 70 controls the flow of coolant to the heat exchanger by means of the regulation of a valve 71 having a valve controller 72.

The solution formed in tank 40 is discharged through a discharge conduit 75 having a normally closed valve 76 therein. Valve 76 is operated by a solenoid 77. Air is admitted to the tank for the discharge of the fluid through a conduit 78 having a valve 79 therein. Valve 79 is operated by solenoid 80.

Automatic operation is directed by a suitable sequence timer generally 85 comprising a shaft 86 mounted in suitable bearings 87 and driven by a motor 88. On shaft 86 are four cams 90, 91, 92, 93, respectively, which operate four switches 95, 96, 97, 98, respectively.

A pair of electric lines 100 and 101 are connected to a suitable source of electric power. From lines 100 and 101 a pair of wires 102 and 103 feed motor 88 and a pair of wires 104 and 105 feed vacuum pump 42. Wire 106 connects line 101 to one side of each of switches 95 through 98. The other side of switch 95 is connected by a wire 107 to solenoid 44. The other side of switch 96 is connected by a wire 108 to solenoids 48 and 51. Similarly, the other side of switch 97 is connected by a wire 109 to solenoid 67. Solenoids 77 and 80 are connected by a wire 110 to the other side of switch 98. The other side of each of the solenoids 44, 48, 51, 67, 77 and 80 are connected to line 100.

Wires 111 and 112 connect thermostat 70 to valve operator 72. Thermostat 70 is connected to lines 100 and 101 by wires 113 and 114.

The operation of the embodiment of Fig. 2 is commenced by filling tank 56 with water and boiling that water to remove any air therefrom. Pump 64 is operated to fill conduit 63 and heat exchanger 65. Initially sufficient time is permitted to adjust the temperature of the water in heat exchanger 65. In the disclosed embodiment the heat exchanger should have sufficient volume at least to hold the amount of water required to fill tank 40. Of course, this may be varied with other types of temperature-conditioning apparatus.

Wires 100 and 101 are energized to start vacuum pump and motor 88 of sequence timer 85. As the cams of the sequence timer rotate, cam 90 first closes switch 95 to open valve 43 and draw a vacuum on tank 40. When this is done, switch 95 is opened, closing valve 43. Switch 96 is closed by cam 91 to open valves 47 and 50, permitting nitric oxide from tank 45 to supply tank 40, the amount of gas being controlled by the volume of tank 40 and the pressure setting of regulator valve 49. In some embodiments it may be desirable to leave valve 43 open for just a brief period of time after the opening of valves 47 and 50. This is readily done by the setting of cams 90 and 91.

After sufficient time is allowed for tank 40 to arrive at the pressure corresponding to the setting of regulator valve 49, switch 96 is opened and switch 97 is closed by cam 92. Switch 97 energizes solenoid 67 to open valve 66, whereupon tank 40 is filled with deaerated, temperature-controlled water from conduit 63. Switch 97 is opened, and switch 98 is closed by cam 93. Switch 98 energizes solenoids 77 and 80 of valves 76 and 79 respectively. The nitric oxide solution is drained from tank 40 through conduit 75. Sequence timer 85 continues repeating the above cycle for as long as it is desired to continue producing the nitric oxide solution.

With a tank 40 having a capacity of 2500 cubic inches, a 50% solution of nitric oxide is produced by backfilling 2.2 inches Hg with nitric oxide. This is accomplished by first drawing a vacuum on tank 40 of e.g. 29 inches Hg and introducing the gas to reduce the vacuum to 26.3 inches Hg. Water is introduced into tank 40 at a temperature of 5° C. Within 30 seconds after filling tank 40 with water, the solution may be drained through conduit 75. If a 100% solution of nitric oxide were desired, the same conditions could be maintained, with the exception that the tank is backfilled with 4.4 inches Hg of nitric oxide rather than 2.2 inches Hg as in the 50% solution example.

The foregoing specific examples are for the purpose of complying with 35 U.S.C. 112 and should not be construed as imposing any unnecessary limitations upon the appended claims inasmuch as variations of the examples will be apparent to those skilled in the art from the foregoing description. For example, the water used to fill the tank might be deaerated other than by boiling as described in connection with Fig. 2. Another procedure might be to pass steam over hot copper with the steam then being condensed to obtain the water for filling tank 40. Obviously, the greater vacuum drawn by pump 42, the better will be the exclusion of air from tank 40, since any remaining air will react with the nitric oxide to produce various other oxides of nitrogen, which is wasteful and may be undesirable.

The water delivered to the mixing tanks 10 and 40 may be of any temperature between the temperature at which the water would freeze and the temperature at which it would vaporize. Of course, the solubility will be affected by the temperature employed. We prefer to operate in the range between 40° F. and 50° F. Operating in this range, the water should be held in the tank 40 for at least 30 seconds after it is introduced into the tank with the nitric oxide therein.

We claim:

1. The method of forming a nitric oxide solution of a predetermined concentration including the steps of sequentially evacuating an enclosed space, introducing a predetermined quantity of nitric oxide gas into said evacuated enclosed space, and filling said enclosed space with water.

2. The method of forming a nitric oxide solution of a predetermined concentration including the steps of evacuating to a predetermined pressure an enclosed space of a predetermined volume, backfilling said enclosed space with nitric oxide gas to a given pressure and filling said enclosed space with water.

3. The method of forming a nitric oxide solution of a predetermined concentration including the steps of evacuating to a predetermined pressure an enclosed space of a predetermined volume, backfilling said enclosed space with nitric oxide gas to a given pressure and filling said enclosed space with water at a given temperature.

4. The method of forming a nitric oxide solution of a predetermined concentration including the steps of evacuating an enclosed space, introducing a predetermined quantity of nitric oxide gas into said evacuated enclosed space, boiling some water, cooling said water to a given temperature, and filling said enclosed space with said boiled and cooled water.

5. The method of forming a nitric oxide solution of a predetermined concentration including the steps of evacuating to a predetermined pressure an enclosed space of a predetermined volume, backfilling said enclosed space with nitric oxide gas to a given pressure, boiling some water, cooling said water to a given temperature, and filling said enclosed space with said boiled and cooled water.

6. Apparatus for the preparation of an aqueous solution of nitric oxide gas, said apparatus including a tank of known volume, a vacuum source, a conduit connecting said vacuum source with said tank, a source of nitric oxide gas, a conduit connecting said gas source with said tank, an adjustable pressure regulator valve in said last-named conduit for stopping the flow of gas on reaching a selected pressure within said tank, a source of deaerated water of a given temperature, a conduit connecting said water source with said tank, a separate discharge conduit connected to said tank, a valve in each of said conduits, control means connected to each of said valves to sequentially evacuate said tank and to introduce gas to said selected pressure into said tank, to fill said tank with water and to discharge the nitric oxide solution from said tank.

7. The method of forming a nitric oxide solution of a predetermined concentration including the steps of evacuating an enclosed space of a certain volume, introducing a predetermined quantity of nitric oxide gas into said evacuated enclosed space, deaerating a quantity of water, said quantity being equal to said certain volume, and filling said enclosed space containing said nitric oxide with said quantity of deaerated water.

8. Apparatus for the preparation of a preselected solution of gas in liquid, said apparatus including a tank of known volume, a vacuum source, a conduit connecting said vacuum source with said tank, a source of a soluble gas, a conduit connecting said gas source with said tank, an adjustable pressure regulator valve in said last named conduit for stopping the flow of gas on reaching a selected pressure within said tank, a source of deaerated liquid of a given temperature, a conduit connecting said liquid source with said tank, a separate discharge conduit connected to said tank, a valve in each of said conduits, control means connected to each of said valves to sequentially evacuate said tank and to introduce gas to said selected pressure into said tank, to fill said tank with liquid and to discharge the resultant gas in liquid solution from said tank.

References Cited in the file of this patent
UNITED STATES PATENTS 2,641,399    McBean _____ June 9, 1953
2,653,620    Morgan _____ Sept. 29, 1953

OTHER REFERENCES

Mellor: "Comprehensive Treatise on Inorganic and Theoretical Chemistry," page 423, 2nd paragraph, lines 1 to 9.